(12) United States Patent
Hillion et al.

(10) Patent No.: US 7,652,156 B2
(45) Date of Patent: Jan. 26, 2010

(54) REFINED METHOD FOR MANUFACTURING ETHYL ESTERS FROM FATTY SUBSTANCES OF NATURAL ORIGIN

(75) Inventors: Gérard Hillion, Herblay (FR); Bruno Delfort, Paris (FR)

(73) Assignee: Institut Francais du Petrole, Rueil Malmasion Cedex (FR)

( * ) Notice: Subject to any disclaimer, the term of this patent is extended or adjusted under 35 U.S.C. 154(b) by 9 days.

(21) Appl. No.: 11/523,737

(22) Filed: Sep. 20, 2006

(65) Prior Publication Data

US 2007/0112212 A1    May 17, 2007

(30) Foreign Application Priority Data

Sep. 21, 2005    (FR) .................................. 05 09733

(51) Int. Cl.
*C11C 3/00* (2006.01)
(52) U.S. Cl. ...................... 554/169; 554/161; 554/167; 554/179
(58) Field of Classification Search ................. 554/161, 554/167, 169, 175, 179
See application file for complete search history.

(56) References Cited

U.S. PATENT DOCUMENTS

| | | | | |
|---|---|---|---|---|
| 4,303,590 | A | * 12/1981 | Tanaka et al. | ............... 554/167 |
| 4,695,411 | A | * 9/1987 | Stern et al. | ................... 554/167 |
| 5,354,878 | A | 10/1994 | Connemann et al. | |
| 5,424,466 | A | * 6/1995 | Stern et al. | ................... 554/175 |
| 5,434,279 | A | 7/1995 | Wimmer et al. | |
| 5,514,820 | A | 5/1996 | Assman et al. | |

2003/0004363 A1    1/2003   Koncar et al.

FOREIGN PATENT DOCUMENTS

DE            42 38 195 A1    5/1994

OTHER PUBLICATIONS

Schuchardt, U. et al., Transesterification of Vegetable Oils: a Review:, 1998, Journal of Brazilian Chemical Society, vol. 9, No. 1, pp. 199-202.*

* cited by examiner

*Primary Examiner*—Rosalynd Keys
*Assistant Examiner*—Yate' K Cutliff
(74) *Attorney, Agent, or Firm*—Millen, White, Zelano & Branigan, P.C.

(57) ABSTRACT

A method allowing, from natural fat or oils, vegetable or animal, or from other glyceride mixtures, to obtain in a quasi-quantitative way fatty acid ethyl esters that can be used as gas oil substitutes, comprises the succession of stages as follows:

a stage (a) wherein the oil, the fat or the glyceride mixture is transesterified by ethanol using a soluble catalyst or a catalyst that becomes soluble during the reaction, a stage (b) wherein the glycerin formed is decanted and removed, without requiring an excess ethanol evaporation operation, a stage (c) wherein a second transesterification reaction is carried out so as to obtain a product whose ester content is at least 97% by mass, a stage (d) wherein controlled neutralization of the catalyst is carried out, a stage (e) wherein the excess ethanol is removed by distillation, a stage (f) wherein the ester undergoes purification by means of water wash sequences, and a stage (g) wherein the ester mixture is dried under reduced pressure.

19 Claims, 1 Drawing Sheet

REFINED METHOD FOR MANUFACTURING ETHYL ESTERS FROM FATTY SUBSTANCES OF NATURAL ORIGIN

FIELD OF THE INVENTION

The present invention relates to the manufacture of fatty acid ethyl esters that can be used as gas oil substitutes, from natural fat or oils, vegetable or animal, or from other glyceride mixtures.

The object thereof is more particularly an improved transesterification method allowing, from natural fat or oils, vegetable or animal, or from other glyceride mixtures, to obtain in a quasi-quantitative way fatty acid ethyl esters.

BACKGROUND OF THE INVENTION

The transesterification reaction using methanol and ethanol is well known to the man skilled in the art. It most commonly uses homogeneous catalysts, for example acid catalysts (sulfonic acids, sulfuric acid, etc.), as described notably in U.S. Pat. No. 4,695,411, various metallic compounds, for example metallic salts such as titanium, zinc, magnesium, tin, antimony or lead salts, and these metallic compounds can be used in form of alcoholates, alkyl derivatives or oxides. Preferably, owing to the high reactivity thereof, homogeneous basic catalysts of NaOH, KOH or LiOH type in solution in methanol are more particularly used, or directly alcoholates of these metals, or even certain carbonates such as potassium carbonate and sodium carbonate for example, as mentioned by Freedman B. Et al.: JAOCS 61 No. 10, p. 1638; by Pryde E. H., "Vegetable Oil Fuels", Proc. Int. Conf., Fargo, N. Dak., 1982, pp. 117-122; and in U.S. Pat. No. 2,383,602.

Transesterification in the presence of methanol is generally carried out in a single catalysis stage in the case of a batch reaction or at least in two catalysis stages in the case of a continuous operation using overflow reactors as described in U.S. Pat. No. 5,354,878.

The ethanolysis methods described are few and much less effective than those using methanol. In fact, with ethanol and with the same alcohol/oil molar ratio than with methanol, it is impossible to obtain naturally separation of the glycerol formed (see notably U.S. Pat. No. 2,383,602).

The solvent power of ethanol being much higher than that of methanol, the consequence is that the glycerin formed during the reaction is made soluble. The conversion to esters is penalized thereby, which does not allow a high conversion in a single reaction stage to be obtained.

A second transesterification stage is thus necessary after removing the glycerin formed from the reaction medium.

Partial ethanol distillation or addition of a certain amount of water or of a third solvent such as a hydrocarbon, n-heptane for example, allows the solubility of the glycerin to be decreased and a sufficient amount thereof to be eliminated, which allows to reach a high conversion in the second catalysis stage. Another option allowing high conversions to be obtained consists in distilling under certain conditions and under reduced pressure the ethyl esters produced during the first transesterification stage.

SUMMARY OF THE INVENTION

Surprisingly, it has now been discovered that it is possible to carry out ethanolysis of an oil, a fat, or any other glyceride mixture, in two catalysis stages using a soluble basic catalyst, while obtaining natural decantation of the glycerin after the first transesterification stage without requiring excess alcohol distillation or addition of water or of a third solvent.

DETAILED DESCRIPTION OF THE INVENTION

Figure 1:
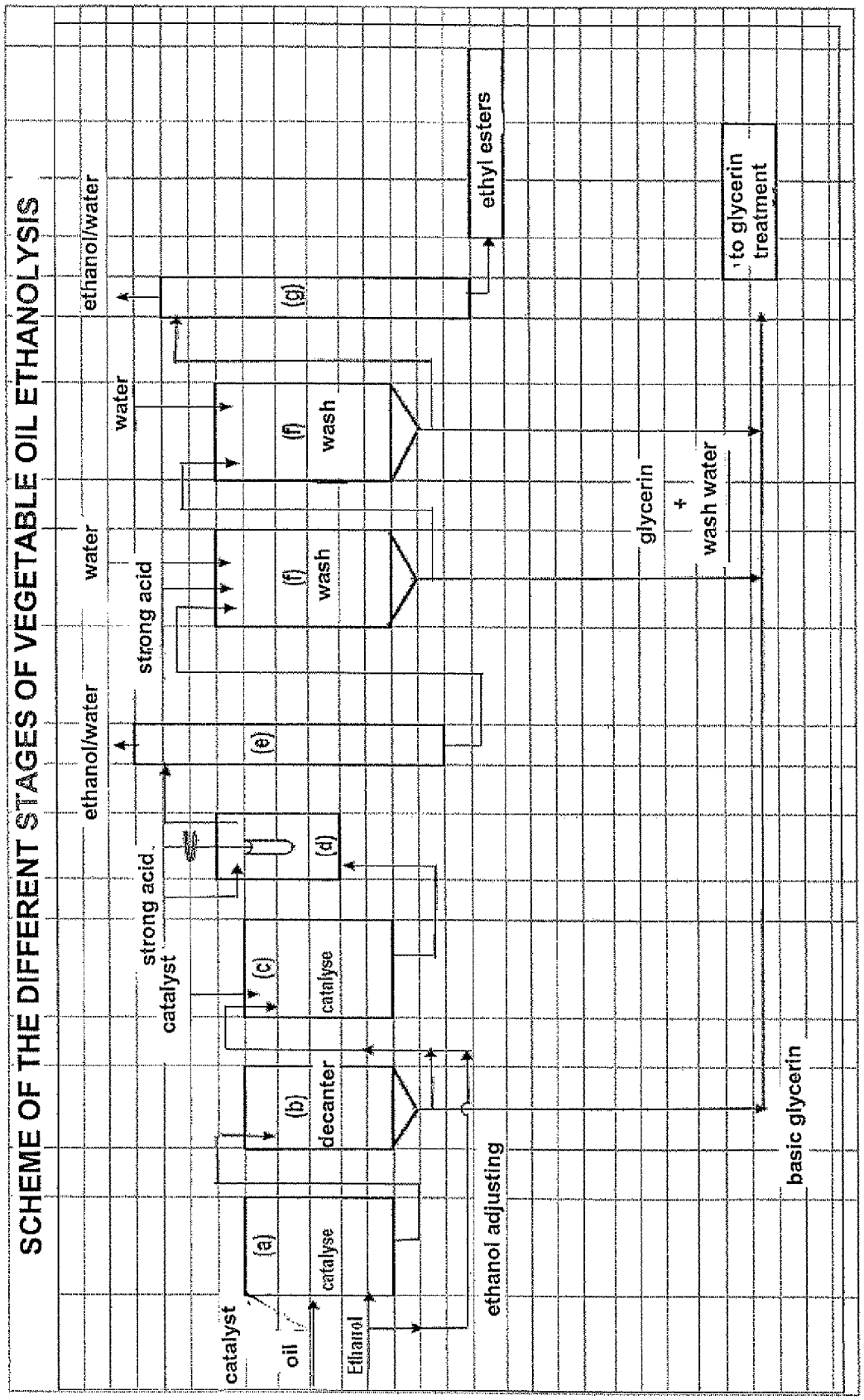
FIG. 1 shows a block-diagram with the various stages of the ethanolysis of a vegetable oil.

The invention thus provides a method for manufacturing fatty acid ethyl esters from vegetable or animal oils or fat or from other glyceride mixtures, wherein the transesterification stages are carried out in batch mode (discontinuous), and comprising the succession of stages as follows:

a stage (a) wherein the oil, the fat or the glyceride mixture is transesterified by ethanol using a soluble catalyst or a catalyst that becomes soluble during the reaction, a stage (b) wherein the glycerin formed is decanted and removed (without requiring an excess ethanol evaporation operation), a stage (c) wherein a second transesterification reaction is carried out so as to obtain a product whose ester content is at least 97% by mass, a stage (d) wherein controlled neutralization of the catalyst is carried out, a stage (e) wherein the excess ethanol is removed by distillation, a stage (f) wherein the ester undergoes purification by means of water wash sequences, and a stage (g) wherein the ester mixture is dried under reduced pressure.

In the method according to the invention, a conversion to manufactured esters greater than or equal to 90% is readily obtained at the end of the first catalysis stage [stage (a)] by judiciously distributing the ethanol stoichiometry over the two transesterification stages (a) and (c) and by using as the catalyst either an alkaline alcoholate obtained by dissolution in an alcohol (methanol or ethanol) of a sodium, potassium or lithium hydroxide, or a commercially available methanolic sodium methylate solution. It is then possible, after removing the glycerin formed, to carry out the second catalysis stage [stage (c)] after adding make-up ethanol and catalyst. The conversion to ethyl esters thus obtained is then sufficient to reach the required quality for a mixture of esters intended for use as fuel.

Using as the catalyst in stages (a) and (c) an alkaline metal alcoholate, sodium or potassium ethylate or methylate for example, advantageously allows to obtain practically anhydrous ethanol at the end of the second catalysis stage. In fact, the alcoholate acts as a desiccant, as shown by the chemical hydrolysis equation of the alcoholate by water (the water coming essentially from the feedstocks: oil and ethanol). This reaction is stoichiometric and, in the case of methylate, it is written as follows:

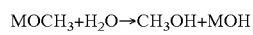

(where M represents the alkaline metal). This is a neat way of physically removing the water from the reaction medium.

Furthermore, after the second catalysis stage [stage (c)], the controlled active catalysis neutralization stage (d), which only affects the sodium alcoholates (methylate, ethylate and/or glycerate) allows nearly total elimination of the excess ethanol present in the medium without any risk of retroreaction, which consists in the reaction of the glycerol present with the ethyl esters so as to form glycerides (of mono, di and triglyceride type) again.

The various stages of the method according to the invention are described more in detail hereafter in connection with the appended FIGURE.

Stage (a)

The initial oil, fat, vegetable or animal, or the initial mixture of glycerides generally has an acid number of at most 2. Ethanol whose water content ranges for example between 3000 and 5000 ppm is generally used, using an ethanol/oil stoichiometry such as to obtain a conversion to manufactured esters greater than or equal to 90%. This to ethanol/oil stoichiometry generally ranges between 1.3 and 2, preferably between 1.6 and 1.8.

The advantage of this stage in the method according to the invention is that the implementation thereof allows, in next stage (b), natural decantation of the glycerin without requiring any excess ethanol evaporation operation.

The catalyst used is a homogeneous basic catalyst, i.e. a soluble catalyst, or a catalyst that becomes soluble during the reaction. It can be obtained for example by dissolution of a strong base in an alcohol (methanol or ethanol), or from an alkaline metal alcoholate, which can be for example a sodium ethylate or methylate, or from a metallic compound of alcoholate, alkyl and/or oxide type. Sodium methylate is preferably used because it has the advantage of being cheap, industrially available in 30% solution in methanol.

The reaction temperature generally ranges between 20° C. and 100° C., preferably between 40° C. and 80° C.

In batch mode, the reaction time allowing thermodynamic equilibrium to be reached generally ranges between 40 and 160 minutes.

It can be noted that, if an alkaline metal methylate in solution in methanol is used as the catalyst, the mixture of esters obtained will contain a certain proportion of methyl esters, generally ranging between 10 and 15% by mass.

Stage (b)

Natural decantation of the glycerin is obtained as soon as stirring stops and at a medium temperature ranging for example between 40° C. and 60° C. The glycerin contained in the lower phase is then eliminated by draw-off.

Stage (c)

This second transesterification stage is carried out after adding a new amount of alkaline catalyst and an amount of ethanol corresponding to an initial ethanol/oil stoichiometry generally ranging between 0.3 and 1, preferably between 0.5 and 0.7.

The catalysis temperature is of the same order as that of stage (a), with a catalysis time ranging between 20 and 45 minutes.

This stage (c) allows to obtain a product whose ester content is at least 97% by mass.

Stage (d)

Selective neutralization of the catalyst part corresponding to the sodium alcoholates is carried out by means of a strong mineral acid.

Aqueous solutions of hydrochloric, sulfuric or phosphoric acid can be used for example. Although it is of interest to collect a dry ethanol after neutralization, it is also possible to use a water-free acid, gaseous hydrochloric acid for example.

At this stage of the method, the catalyst contained in the reaction medium is made up of a mixture of alcoholates and of sodium soaps. A potentiometric titration by HCl 0.1N for example allows to determine the concentration of each sodium salt (alcoholates and soaps) present in the ester mixture. Selective neutralization of the strong basicity (of alcoholates) towards soaps allows to prevent the release of fatty acids in the ester mixture, knowing that this fatty acidity may increase the acid number of the mixture up to a value above 0.5, the ester mixture obtained being then off specifications.

The excess ethanol present in the reaction medium after the second catalysis stage [stage (c)] is practically anhydrous. This ethanol quality can be kept after neutralization using a water-free strong acid such as gaseous hydrochloric acid for example.

Stage (e)

In this stage, the excess ethanol is removed from the reaction medium generally by distillation.

The excess ethanol removed is practically anhydrous if, during stage (d), neutralization was carried out using a water-free strong acid such as gaseous hydrochloric acid for example. The ethanol can then be recycled without requiring a rectification stage.

On the other hand, if an aqueous solution of a mineral acid (aqueous solutions of hydrochloric acid contain at best 65 to 70% water for example) was used for neutralization in stage (d), the ethanol can contain a variable proportion of water depending on the dilution ratio of the acid solution used. In this case, the ethanol has to be rectified, then dried by means of suitable and known techniques such as azeotropic distillation, passage through molecular sieves and/or pervaporation on membranes.

The selective neutralization of the active catalyst carried out in stage (d) allows to prevent retroreaction whatever the distillation conditions, which allows to carry on with the excess ethanol evaporation until nearly total elimination thereof in the ester mixture.

Stage (f)

In this stage, the ester phase is purified by being freed from the residual catalyst and from the soluble glycerin by a succession of water wash operations.

If necessary, a first neutralizing wash that efficiently eliminates the traces of sodium soap contained in the ester phase can be carried out using a strong mineral acid such as sulfuric acid, hydrochloric acid or phosphoric acid, then one or more wash cycles are carried out with pure water depending on the strong excess acid elimination efficiency.

Stage (g)

Water and ethanol traces are eliminated by drying (evaporation under reduced pressure) so that the ester mixture meets the specifications required for a biodiesel fuel concerning the two criteria (water and ethanol content) of the EN 14214 standard.

NB: Reminder of the specifications from the EN 14214 standard:

Triglycerides=<0.2
Diglycerides=<0.20
Monoglycerides=<0.80
Fatty acid esters=96.50 mini The following examples illustrate the method according to the invention.

EXAMPLE 1

Comparative

Ethanolysis Reaction 500 g refined colza oil of alimentary quality and 180 g ethanol containing at most 1000 ppm water, which corresponds to an alcohol/oil stoichiometry of 2.3, is fed into a stirred double-walled glass reactor equipped with a bottom valve and heated to 70° C. 8 g of a 30% methanolic sodium methylate solution is added as soon as a temperature of 70° C. is reached. Stirring and the 70° C.±2° C. temperature are maintained for 60 minutes.

Samples are taken after 20, 30, 45 and 60 minutes. On each sample, the active to catalyst is immediately destroyed through the action of a 10% aqueous sulfuric acid solution, which freezes the conversion. The supernatent ester phase is then analyzed.

Liquid gel-permeation chromatography allows to determine the composition of the mixture of esters and of partial glycerides.

There is no more conversion evolution between 45 and 60 minutes of catalysis time, which means that thermodynamic equilibrium of the transesterification reaction is reached after a 45-minute residence time.

The composition, expressed in % by mass, is as follows:
Triglycerides=0.03
Diglycerides=0.4
Sterols and derivatives=1.6
Monoglycerides=3.02
Fatty acid esters=94.95.

EXAMPLE 2

Comparative

Methanolysis Reaction 500 g refined colza oil of alimentary quality and 125 g methanol containing at most 1000 ppm water, which corresponds to an alcohol/oil stoichiometry of 2.3, is fed into a stirred double-walled glass reactor equipped with a bottom valve. 8 g of a 30% methanolic sodium methylate solution is added as soon as a temperature of 70° C. is reached. Stirring and the 70° C.±2° C. temperature are maintained for 60 minutes.

Samples are taken after 20, 30, 45 and 60 minutes. On each sample, the active catalyst is immediately destroyed through the action of a 10% aqueous sulfuric acid solution, which freezes the conversion. The supernatent ester phase is then analyzed.

Liquid gel-permeation chromatography allows to determine the composition of the mixture of esters and of partial glycerides.

There is no more conversion evolution between 45 and 60 minutes of catalysis time, which means that thermodynamic equilibrium of the transesterification reaction is reached after a 45-minute residence time.

The composition, expressed in % by mass, is as follows:
Triglycerides=0.05
Diglycerides=0.10
Sterols and derivatives=1.6
Monoglycerides=0.75
Fatty acid esters=97.50.

EXAMPLE 3

According to the Invention 1000 g refined colza oil of alimentary quality and 266 g ethanol containing 3000 ppm water, respecting an alcohol/oil stoichiometry of 1.7, is fed into a stirred glass reactor equipped with a bottom valve and heated to 70° C. 10 g of a 30% methanolic sodium methylate solution is then added. Stirring and the 70° C.±2° C. temperature are maintained for 60 minutes (stage (a)).

In stage (b), the reaction medium is decanted at a temperature close to 60° C. After 15 to 20 minutes decantation, 95 g of a glycerin solution consisting of glycerin, ethanol, ethyl esters, sodium soaps and sodium alcoholates (mixture of methylate, ethylate and glycerate) is drawn off.

After this first transesterification reaction, the composition of the mixture of esters is as follows (in % by mass):
ethyl and methyl esters: 91.5
triglycerides: 0.9
diglycerides: 2.6
monoglycerides: 3.7
sterols and sterol esters: 1.3.

A second transesterification stage is carried out in stage (c). 93 g ethanol containing approximately 3000 ppm water, which corresponds to an initial ethanol/oil stoichiometry of 0.6, and 3.33 g sodium methylate in 30% solution in methanol is added to the ester phase. The medium is stirred at 60° C. for at least 30 minutes.

Under such temperature conditions, the glycerin formed remains soluble in the reaction medium.

At the end of this second transesterification reaction, the composition of the mixture is as follows (in % by mass):
ethyl and methyl esters: 97.5
triglycerides: <0.1
diglycerides: 0.2
monoglycerides: 0.7
sterols and sterol esters: 1.6.

In stage (d), the sodium alcoholates (active catalyst) present in the medium are essentially neutralized. A potentiometric titration determines the alcoholate content of the medium. 4.62 g of a 30% hydrochloric acid solution (i.e. 0.038 moles of $H^+$ equivalent) is added. The pH value obtained is 6.2. This proportion of hydrochloric acid corresponds to a 5% excess amount in relation to stoichiometry, which allows to ensure is total neutralization of the alcoholates while minimizing the release of fatty acids due to the neutralization of the soaps.

In stage (e), the excess ethanol is removed in a suitable distillation equipment. The temperature at the drum bottom is 140° C. and the pressure at the end of the distillation process is 160 mm Hg.

Under such conditions, no retroreaction is observed. The residual ethanol content is 0.086% for an initial ethanol content of the order of 17% in the ester mixture.

The water content of the ethanol obtained is of the order of 2% by weight.

In stage (f), the ethyl ester phase obtained is purified by carrying out a water wash sequence.

All of the reaction mixture is fed into the reactor equipped with a bottom valve and the temperature is brought to 60° C. 30 g deionized water is added, then the mixture is stirred for 5 minutes and decanted for 15 to 20 minutes. An aqueous phase rich in alcohol, glycerin and sodium salts is collected. This operation is repeated until the pH value obtained for the aqueous solution ranges between 7 and 8.

The mixture of esters obtained respects the EN 14214 standard relative to biodiesel fuels and its composition is as follows (in % mass):
ethyl and methyl esters: 97.6
triglycerides: <0.1
diglycerides: 0.2
monoglycerides: 0.6
sterols and sterol esters: 1.6
A.N. (Acid Number)=0.23.

After drying stage (g), 1028 g of a mixture of ethyl and methyl esters containing 10.3% methyl esters is collected. The presence of methyl esters is due to the use of sodium methylate as the catalyst and all of the methanol used is converted to methyl esters.

EXAMPLE 4

Example 3 is repeated identically. Only the operating conditions of stage (e), which consists in removing the major part of the excess ethanol, are changed.

The operating conditions are a drum bottom temperature of 160° C. and a pressure at distillation end of 160 mm Hg.

Under such conditions, no retroreaction is observed. The residual ethanol content of the ester mixture is below 0.01%. The water content of the distilled ethanol is of the order of 2% by weight and the composition of the ester mixture is as follows (in % by mass):
- ethyl and methyl esters: 97.5
- triglycerides: <0.1
- diglycerides: 0.2
- monoglycerides: 0.7
- sterols and sterol esters: 1.6
- A.N. (Acid Number) 0.25.

EXAMPLE 5

Comparative

Example 3 is repeated identically, up to and including stage (c).

In ester mixture neutralization stage (d), a proportion of hydrochloric acid (30% solution) such that a pH value close to 2 is obtained is added.

Purification stages (e) to (g) are identical to those described in example 3.

Under such conditions, the sodium soaps present release fatty acids that are thereafter found in the ester mixture, whose composition is as follows (in % by mass):
- ethyl and methyl esters: 97.6
- triglycerides: <0.1
- diglycerides: 0.2
- monoglycerides: 0.6
- sterols and sterol esters: 1.6
- A.N. (Acid Number)=1.18.

The acid number of the mixture is above 0.5 and does not meet the 0.5 specification required for a biodiesel fuel.

The invention claimed is:

1. A method for manufacturing fatty acid ethyl esters from an oil encompassing vegetable or animal oils or fat or other glyceride mixtures, said oil having an acid number of at most 2, comprising a succession of stages as follows:
    a batch stage (a) wherein the oil, the fat or the glyceride mixture is catalytically transesterified by ethanol with a soluble basic catalyst or a basic catalyst that becomes soluble during the reaction with ethanol, said ethanol having a water content of between 3000 and 5000 ppm, thereby forming a mixture of fatty acid esters and glycerin,
    a stage (b) wherein the glycerin formed is decanted from said mixture of fatty acid esters and glycerin and removed without any steps of evaporating excess ethanol or introducing additional water or a hydrocarbon solvent to facilitate decantation and obtain an ester product,
    a batch stage (c) wherein a second transesterification reaction is carried out on said ester product of stage (b) with makeup ethanol, said makeup ethanol having a water content of between 3000 and 5000 ppm, in the presence of makeup soluble basic catalyst or a basic catalyst that becomes soluble during the reaction so as to obtain a product whose ethyl ester content is at least 97% by mass,
    a stage (d) wherein controlled neutralization of the soluble basic catalyst in a reaction medium from stage (c) is carried out, said neutralization comprising adding a sufficient content of mineral acid to neutralize said basic catalyst selectively, and to provide an acidified product having an acid number not higher than 0.5, thereby substantially preventing a retroreaction in a following distillation step,
    a stage (e) wherein excess ethanol is removed from said acidification product of stage (d) by said distillation step,
    a stage (f) wherein resultant ethyl ester of stage (e) undergoes purification comprising at least one water wash sequence, and
    a stage (g) wherein resultant washed ethyl ester of stage (f) is dried.

2. A method as claimed in claim 1, wherein stage (a) is conducted with an ethanol/oil stoichiometric ratio ranging between 1.3 and 2, and said drying in step (g) is conducted under reduced pressure.

3. A method as claimed in claim 2, wherein said ethanol/oil stoichiometric ratio ranges between 1.6 and 1.8.

4. A method as claimed in claim 1, wherein stages (a) and (c), are conducted with a catalyst obtained by dissolution of a strong base in alcohol, or from an alkaline metal alcoholate, or from a metallic compound of alcoholate, alkyl and/or oxide.

5. A method as claimed in claim 1, wherein said catalyst in step (d) comprises sodium alcoholate.

6. A method as claimed in claim 1, comprising conducting stages (a) and (c) at a temperature range between 20° C. and 100° C.

7. A method as claimed in claim 1, comprising conducting stage (a), in a batch mode allowing the batch to reach thermodynamic equilibrium at between 40 and 160 minutes.

8. A method as claimed in claim 1, comprising conducting the decantation of the glycerin in stage (b) at a temperature between 40° C. and 60° C.

9. A method as claimed in claim 1, comprising conducting stage (c), so that the amount of ethanol consumed corresponds to an initial ethanol/oil stoichiometric ratio ranging between 0.3 and 1.

10. A method as claimed in claim 9, wherein said initial ethanol/oil stoichiometric ratio ranges between 0.5 and 0.7.

11. A method as claimed in claim 9, wherein, in stage (c), wherein the second transesterification reaction is conducted for 20 to 45 minutes in the presence of said catalyst.

12. A method as claimed in claim 1, comprising, in stage (d), adding a proportion of acid such that only active catalyst is neutralized.

13. A method as claimed in claim 1, wherein, in stage (f), a first neutralizing wash is carried out using a strong mineral acid, followed by one or more wash cycles with pure water.

14. A method as claimed in claim 10, wherein, in stage (c), the second transesterification reaction is conducted for 20 to 45 minutes in presence of said catalyst.

15. A method according to claim 1, wherein batch stage (a) is conducted under sufficient conditions to form glycerin and to yield at least a 90% conversion to fatty acid ethyl esters.

16. A method according to claim 1, wherein step (c) is conducted under such conditions that at the end of step (c) the formed glycerin remains soluble.

17. A method according to claim 15, wherein step (c) is conducted under such conditions that at the end of step (c) the formed glycerin remains soluble.

18. A method according to claim 1, wherein step (d) further comprises a potentiometric titration to determine how much basic catalyst is in the medium.

19. A method according to claim 5, wherein step (d) further comprises a potentiometric titration to determine how much sodium alcoholate is in the medium.

* * * * *

UNITED STATES PATENT AND TRADEMARK OFFICE
CERTIFICATE OF CORRECTION

PATENT NO. : 7,652,156 B2 Page 1 of 1
APPLICATION NO. : 11/523737
DATED : January 26, 2010
INVENTOR(S) : Hillion et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 127 days.

Signed and Sealed this

Twenty-third Day of November, 2010

David J. Kappos
*Director of the United States Patent and Trademark Office*